United States Patent [19]

Bennett

[11] 4,047,798
[45] Sept. 13, 1977

[54] EMERGENCY SIGNALLING DEVICE

[76] Inventor: James M. Bennett, 68 Cooke St. No. 41, Plainville, Conn. 06062

[21] Appl. No.: 691,326

[22] Filed: June 1, 1976

[51] Int. Cl.² .......................... B60Q 1/26; G02B 5/00
[52] U.S. Cl. .................................. 350/97; 116/114 K
[58] Field of Search .................. 116/40, 28 R, 114 K; 350/97; 40/129 C, 130 J, 125 E, 125 H; 248/206 A, 206 R; 224/42.1 R, 42.1 F, 42.1 G

[56] References Cited

U.S. PATENT DOCUMENTS

| | | | |
|---|---|---|---|
| 1,520,815 | 12/1924 | Fisher | 116/40 |
| 1,854,347 | 4/1932 | Partridge, Jr. | 116/40 |
| 2,048,800 | 7/1936 | Levitt | 40/130 J |
| 2,411,187 | 11/1946 | Boogher | 40/130 J |
| 2,613,463 | 10/1952 | Transue | 40/129 C X |
| 3,119,588 | 1/1964 | Keats | 40/125 H X |
| 3,241,796 | 3/1966 | Asher et al. | 248/206 A |
| 3,507,245 | 4/1970 | Grabow | 116/28 R |
| 3,672,323 | 6/1972 | Hawes | 40/129 C |
| 3,922,998 | 12/1975 | May | 116/40 |

*Primary Examiner*—Daniel M. Yasich
*Attorney, Agent, or Firm*—Robert D. Farkas

[57] ABSTRACT

This disclosure pertains to a signalling device which is magnetically temporarily secured to an exterior surface of a motor vehicle. When in use, two end elements are disposed in parallel spaced apart relationship by a plurality of interconnected linkage arms forming a series of parallelograms. When expanded, the apparatus forms a display area having a substantially rectangular shape bounded on two sides by the end elements. The display surfaces of the end elements and the linkage arms are adapted with a reflective material permitting the operator of an oncoming vehicle to readily discern the presence of a disabled vehicle. The linkage arms are collapsible, thereby permitting easy storage within the motor vehicle when not in use. Carrying and size adjusting handles and a locking mechanism for locking the device in a collapsed position are provided.

1 Claim, 5 Drawing Figures

EMERGENCY SIGNALLING DEVICE

BACKGROUND OF THE INVENTION

1. Field of the Invention

This invention relates to passive warning devices and more particularly to that class utilized to warn oncoming motorists of a road hazard.

2. Description of the Prior Art

The prior art abounds with apparatus for warning oncoming motorists of possible road hazards. U.S. Pat. No. 3,797,151 issued on Mar. 19, 1974 to H. B. Dexter teaches a distress sign supported by a base member which is adapted with magnets to secure the sign to the metallic roof of an automobile. U.S. Pat. No. 3,672,323 issued on June 27, 1972 to E. L. Hawes discloses a triangular reflectorized sign having a clip for securing the sign to a vehicle window. The device is collapsible for storage purposes.

Both of the aforementioned Patents suffer from deficiencies which are easily overcome by the instant invention. The Dexter Patent is not collapsible making it difficult to store as well as being susceptible to being displaced by wind gusts against its broad surface area. The Hawes Patent requires the sign assembly to be affixed to the upper edge of an automobile window thereby limiting the placement of the apparatus, restricting the accessability of viewing by oncoming or following vehicles. The instant invention, utilizing magnets, permits the attachment of the display to any metallic part of the disabled vehicle or, if desired, by placement directly on the road at any desired location.

SUMMARY OF THE INVENTION

A primary object of the present invention is to provide an emergency signalling device which is easily brought into the opened reflective position.

Another object is to provide a road sign with a distinctive reflective pattern possessing an eye catching, unmistakeable emergency signalling pattern.

Still another object is to provide a sign which can be easily secured to any metallic surface of a motor vehicle.

Yet another object is to provide a road hazard sign which can be conveniently stored within a motor vehicle when not in use.

The instant invention consists of a pair of longitudinal end elements each having an L-shaped cross-section. Two linkage arms are secured to each of the end elements. One of the linkage arms is pivotably secured at a fixed location on each end element whilst the other linkage arm is slidably affixed along a slot in each of the end elements. The linkage arms affixed to the end elements are in turn pivotably secured to each other at a point midway along the length thereof and pivotably secured to the other pair of linkage arms so as to form a parallelogram. The end elements are maitained in parallel relationship to each other and may come into touching engagement when the linkage arms are caused to pivotably collapse. Any even number of linkage arms may be employed.

When the apparatus is expanded so as to dispose the end elements in spaced apart relationship, a display panel is formed including the plane formed by the expanded linkage arms and one side of each end element. Reflective material disposed on the linkage arms and end elements constitutes the signalling indicia enabling other motorists to easily detect the emergency signalling device. Handles and a locking device facilitate erection and collapsing as well as securing the device in a closed position. Magnets, fastened to the end elements, permit convenient temporary and rapid mounting of the apparatus to metallic portions of a vehicle whilst the L-shaped cross-section of the end elements enable the device to be supported on a non-metallic horizontal surface such as the roadbed. The open construction of the linkage arms presents a minimal wind resistant surface thereby insuring that the apparatus will remain in an upright position when so placed by the user.

These objects, as well as other objects of the present invention, will become more readily apparent after reading the following description of the accompanying drawings.

DESCRIPTION OF THE PREFERRED EMBODIMENT

The structure and method of fabrication of the present invention is applicable to a pair of longitudinal end elements, each having an L-shaped cross-section. The end elements are disposed in spaced apart relationship so as to have one leg of each element disposed inwardly towards the other whilst the remaining elements are in juxtaposed relationship. A track having a U-shaped cross-section, is secured to each of the juxtaposed legs, having the open mouth portion opposite to that of the opposed track. Four uniform length linkage arms are pivotably secured to each other so as to form a parallelogram at the junction of each pair thereof and a half of a parallelogram at each end of the assembly thus formed. One of the linkage arms, at each end of the collapsible assembly, is pivotably secured to an inwardly directed leg of the U-shaped track. The other linkage arm, at each end of the collapsible assembly, is slidably and pivotably engaged withn slots located in the inwardly directed leg of the U-shaped track. Thus, the end elements may be expanded outwardly a distance apart limited only by the length of the linkage arm elements and the length of the slot, and directed inwardly so that they may be brought into touching engagement as the linkage arms fold up.

Each linkage arm is provided with three pivot axes and a pair of slots thereinbetween. The slots contain a strip of reflective material whose reflective surface lies in a plane normal to the pivot axes. The inwardly legs of the L-shaped end elements similarly bear reflective material on the side opposite the juxtaposed leg portion thereof. When viewed in a direction parallel to the pivot axes and on the side opposite that of the U-shaped tracks, a reflective pattern equivalent to two parallel lines having a pair of disconnected X-like figures will be seen by the viewer. If it is desired, the reflective material disposed within the slots in each of the linkage arms may be viewed in the direction of the pivot axes, but opposite to the side at which the inwardly turned legs are located.

Magnets are imbedded in at least one end of an end element and the adjacent end of the other element, facilitating the magnetic mounting of the apparatus so as to erect a reflective plane normal to the metallic surface to which the emergency signalling device is magnetically affixed.

A pair of handles are affixed to the device, one at each of the outermost surfaces of the end elements. A hook and post locking assembly comprises a locking device so as to secure and the end elements in touching engagement as desired.

Figure 1:
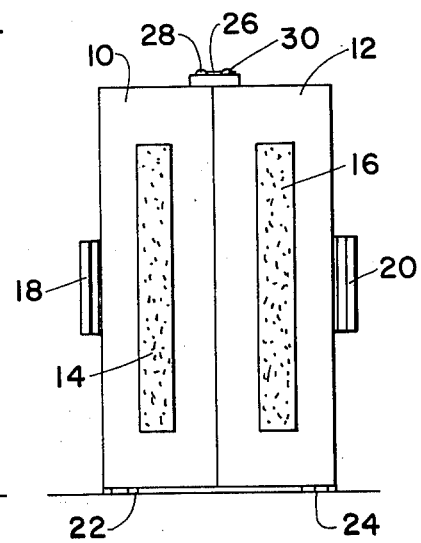
FIG. 1 is a side elevation view of the instant invention shown in the folded position.

Now referring to the Figures, and more particularly to the embodiment illustrated in FIG. 1 showing end elements 10 and 12 having reflective strips 14 and 16 well known in the art, processing reflective properties, secured thereon. Handles 18 and 20 are fixedly secured to end elements 10 and 12 respectively. Magnets 22 and 24 extend downwardly from the lowermost surfaces at the bottom of end elements 10 and 12 respectively. Hook 26 is pivotably secured to end element 10 usilizing pivot rod 28 therefor and is shown engaging securing pin 30, thereby maintaining end elements 10 and 12 in touching engagement.

Figure 2:
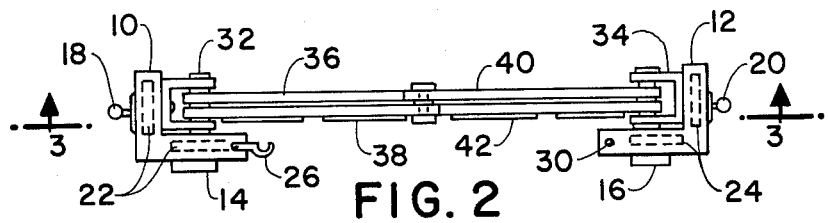
FIG. 2 is a plan view of the instant invention shown in the expanded position.

FIG. 2 illustrates end elements 10 and 12 each having a generally L-shaped cross-section. U-shaped tracks 32 and 34 are fixedly secured to end element 10 and 12 respectively. Handles 18 and 20 extend outwardly from end elements 10 and 12 whilst hook assembly 26 is shown extending inwardly for prospective engagement with securing pin 30. Magnets 22 are illustrated in phantom within the confines of end element 10 and magnets 24 are illustrated in phantom within the confines of end element 12. Linkage arms 36, 38, 40, and 42 are shown extending inwardly between the openings in U-shaped tracks 32 and 34.

Figure 3:
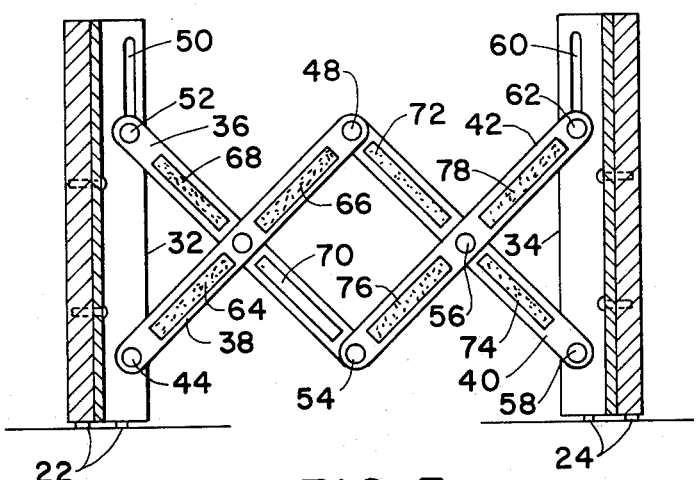
FIG. 3 is a front elevation cross-section view taken along line 3—3 viewed in the direction of arrows 3—3 as shown in FIG. 2 illustrating the instant invention in the expanded position.

FIG. 3 shows one end linkage arm 38 pivotably secured at pivot point 44 to one leg of U-shaped track 32. Linkage arm 38 is also shown pivotably secured to linkage arm 36 at pivot point 46, midway along the length thereof. Finally, the other end of linkage arm 38 is pivotably secured to a free end of linkage arm 40 at pivot point 48. One end of linkage arm 36 is slidably and pivotably engaged within slot 50, located in U-shaped track 32 at pivot point 52. The other end of linkage arm 36 is pivotably engaged to the free end of linkage arm 42 at pivot point 54.

In similar fashion, linkage arms 40 and 42 are pivotably secured to each other, midway along the length thereof at pivot point 56. The other end of linkage arm 40 is pivotably secured at pivot point 58 to U-shaped track 34. The other end of linkage arm 42 is pivotably and slidably engaged within slot 60 at pivot point 62.

Linkage arm 38 bears reflective indicia strips 64 and 66. Linkage arm 36 bears reflective indicia strips 68 and 70. Linkage arm 40 bears reflective indicia strips 72 and 74. Linkage arm 42 bears reflective indicia strips 76 and 78.

Figure 4:
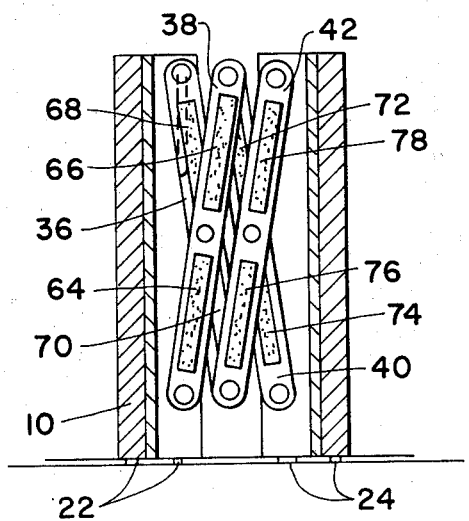
FIG. 4 is a front elevation cross-section view of the embodiment illustrated in FIG. 3 shown in a pseudo-collapsed position.

FIG. 4 shows linkage arms 36, 38, 40, and 42 in a virtually fully collapsed position enabling end elements 10 and 12 to closely approximate each other. In the position shown, reflective strips 64 and 66 partially obliterate reflective strips 68 and 70. In like fashion, reflective strips 76 and 78 partially obliterate reflective strips 72 and 74.

Figure 5:
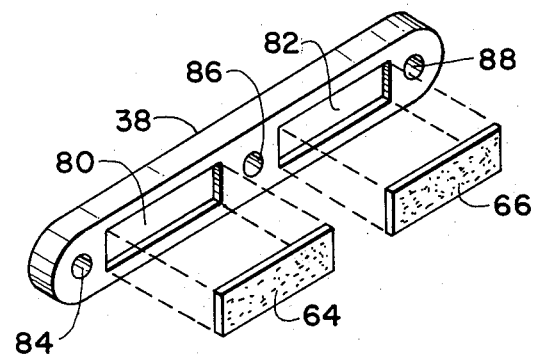
FIG. 5 is a perspective view of one of the linkage arm elements illustrated in FIG. 3 showing the reflective strip material in exploded form.

FIG. 5 illustrates linkage arm 38 with the reflective strips 64 and 66 shown displaced outwardly from slots 80 and 82, located intermediate holes 84, 86, and 88. Holes 84, 86, and 88 extend normally to the plane in which reflective strips 64 and 66 reside and are utilized to secure pivot rods, not shown, enabling pivoting at pivot points 44, 46, and 48, shown in FIG. 3. FIG. 5 typifies the construction and relative location of the pair of reflective strips, slots, and the three pivot points typical of linkage arm assemblies 36, 40 and 42.

One of the advantages is an emergency signalling device which is easily brought into the opened reflective position.

Another advantage is a road sign with a distinctive reflective pattern possessing an eye catching, unmistakble emergency signalling pattern.

Still another advantage is a sign which can be easily secured to any metallic surface of a motor vehicle.

Yet another advantage is a road hazard sign which can be conveniently stored within a motor vehicle when not in use.

Thus, there is disclosed in the above description and in the drawings, an embodiment of the invention which fully and effectively accomplishes the objects thereof. However, it will become apparent to those skilled in the art, how to make variations and modifications to the instant invention. Therefore, this invention is to be limited, not by the specific disclosure herein, but only by the appending claims.

I claim:

1. A compact emergency signalling device comprising a pair of parallelally disposed longitudinal end elements, magnetic securing mens for magnetically fastening said pair of said end elements to a magnetically susceptible surface, linkage means enabling said pair of said end elements to be spacedly maintained a variable distance apart from each other, handle means for manually positioning said pair of said end elements said variable distance apart from each other, light reflection means located on said linkage means for heightening the visibility of said pair of said end elements and said linkage means, wherein each of said pair of said end elements has an L-shaped cross-section, a pair of U-shaped longitudinal tracks, one of said pair of said tracks fixedly secured to one leg of said L-shaped cross-section of said each of said pair of said end elements, the other legs of said L-shaped cross-section of said each of said pair of said end elements directed inwardly towards each other, said one leg of said each of said pair of said end elements disposed in juxtaposed parallel relationship.

* * * * *